US009804829B2

(12) United States Patent
Haswell et al.

(10) Patent No.: US 9,804,829 B2
(45) Date of Patent: Oct. 31, 2017

(54) INTERFACE DEFINITION LANGUAGE COMPILER WITH VERSION RECONCILIATION

(71) Applicant: CA, Inc., New York, NY (US)

(72) Inventors: Josiah Daniel Haswell, Fort Collins, CO (US); James Andrew Perkins, Fort Collins, CO (US)

(*) Notice: Subject to any disclaimer, the term of this patent is extended or adjusted under 35 U.S.C. 154(b) by 30 days.

(21) Appl. No.: 15/087,116

(22) Filed: Mar. 31, 2016

(65) Prior Publication Data

US 2017/0286077 A1    Oct. 5, 2017

(51) Int. Cl.
*G06F 9/45* (2006.01)

(52) U.S. Cl.
CPC ............... *G06F 8/436* (2013.01); *G06F 8/40* (2013.01); *G06F 8/41* (2013.01); *G06F 8/42* (2013.01); *G06F 8/433* (2013.01)

(58) Field of Classification Search
None
See application file for complete search history.

(56) References Cited

U.S. PATENT DOCUMENTS

| 2005/0028143 | A1* | 2/2005 | Aridor | G06F 8/71 |
| | | | | 717/122 |
| 2016/0062765 | A1* | 3/2016 | Ji | G06F 8/75 |
| | | | | 717/122 |

OTHER PUBLICATIONS

Kevin Frei, "Flick: A Flexible, Optimizing IDL Compiler", 1997, ACM.*
Steve Vinoski, "Distributed Object Computing With CORBA", 1993, C++ Report Magazine.*
CodeHaus, "Versions Maven Plugin", CodeHaus, MojoHaus, Version 2.2 retrieved on Aug. 14, 2015, May 21, 2015, 2 pages.
Maven, "Generic Plugin Configuration Information", The Apache Software Foundation, Maven Enforcer Plugin, Usage, Version 1.4.1 retrieved on Aug. 14, 2015, Aug. 23, 2015, 2 pages.
Maven, "Updating POM Versions", The Apache Software Foundation, Maven Plugins, Version 2.5.3 retrieved on Aug. 14, 2015, Oct. 14, 2015, 1 page.
Vinoski, "Distributed Object Computing With CORBA", C++ Report, vol. 5 No. 6, retrieved on Nov. 30, 2015, Jul./Aug. 1993, pp. 32-38.

* cited by examiner

*Primary Examiner* — Lewis A Bullock, Jr.
*Assistant Examiner* — Mark Gooray
(74) *Attorney, Agent, or Firm* — Gilliam IP PLLC (57) ABSTRACT

An interface definition language compiler can be designed to generate different versions of stubs or library files from a same IDL source code. A developer can maintain a single IDL file with code for various versions by using version directives. As part of front end compiling, the IDL compiler will determine which sections of IDL code are compatible with a specified version and compile those determined sections of IDL code. When performing semantic analysis, the IDL compiler will determine whether changes across versions create semantic issues that can be resolved in the target program language by the backend of the compiler. For those changes that cannot be resolved in the target program language, the IDL compiler can generate error notifications.

20 Claims, 4 Drawing Sheets

FIG. 4

INTERFACE DEFINITION LANGUAGE COMPILER WITH VERSION RECONCILIATION

BACKGROUND

The disclosure generally relates to the field of machine programming, and more particularly to an interface definition language compiler.

Many of the applications/services used today run in a heterogeneous computing environment. This environment includes operating systems, applications, extension, plug-ins, libraries, etc. Each of these entities can change at a relatively rapid pace, and may be changed by different owners of the entities. As an example, company A may develop an operating system on which a browser developed and maintained by company B runs. Company C develops and maintains an add-on to the browser. The add-on has dependencies on the browser, which has dependencies on the operating system. With dependencies among these entities, compatibility between entities can be broken due to some changes.

Semantic versioning is a versioning system used to track these changes and aid in identifying or preserving compatibility. In addition to an entity name, each entity is also identified with a three element version identifier in the format "Major.Minor.Patch." The "Major" element is incremented for a major release. A major release is either a first release or a release that introduces any changes that impact backwards compatibility. The "Minor" element is incremented when new, backwards compatible changes are made to software that is released. The "Patch" element is incremented when backwards compatible error corrections (sometimes referred to as "bug fixes") are made to software that is released. To illustrate, browser "ExampleBrowser 42.0.1" is the $42^{nd}$ major release of the browser with 1 patch released for the $42^{nd}$ major release. Referring to the previous example of the OS, browser, and browser add-on and using y and z to refer, respectively, to any minor version and any patch version: update from major version 41 to 42 of the ExampleBrowser may have broken compatibility with an add-on 2.y.z while a major update of the OS from version 7.y.z to version 8.0.0 broke compatibility with ExampleBrowser 41.y.z, which triggered the major release 42 of the ExampleBrowser.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody embodiments of the disclosure. However, it is understood that this disclosure may be practiced without these specific details. In other instances, well-known instruction instances, protocols, structures and techniques have not been shown in detail in order not to obfuscate the description.

Introduction

Distributed object computing or a distributed object system involves distribution of objects across heterogeneous systems while encapsulating the internal structures of the objects. To distribute an object across heterogeneous systems, an object interface is defined according to an interface definition/description language (IDL) which is program language independent. The object interface definition defines public properties of the object, such as a public behavior (i.e., a method/function/procedure/routine) and input/output parameters. An IDL compiler compiles an object interface definition to at least generate a client stub and a server stub. The client stub allows a client to remotely instantiate an object and/or to invoke behavior(s) of the object. When called by the client, the client stub causes marshalling of arguments for the object from the client to a server that implements the object. When a response is received from the server, the client stub unmarshals the response data and returns it to the client. On the server side, the server stub (sometimes referred to as a skeleton) unmarshals the arguments from the client stub and invokes behavior of the object implementation at the object server. Afterwards, the server stub marshals the result of the invoked behavior back to the object client.

Overview

An interface definition language (IDL) compiler can be designed to generate different versions of stubs or library files from a same IDL source code. A developer can maintain a single IDL file with code for various versions by using version directives. As part of front end compiling, the IDL compiler will determine which sections of IDL code are compatible with a specified version and compile those determined sections of IDL code. When performing semantic analysis, the IDL compiler will determine whether changes across versions create semantic issues that can be resolved in the target program language by the backend of the compiler. For those changes that cannot be resolved in the target program language, the IDL compiler can generate error notifications.

Example Illustrations

Figure 1:
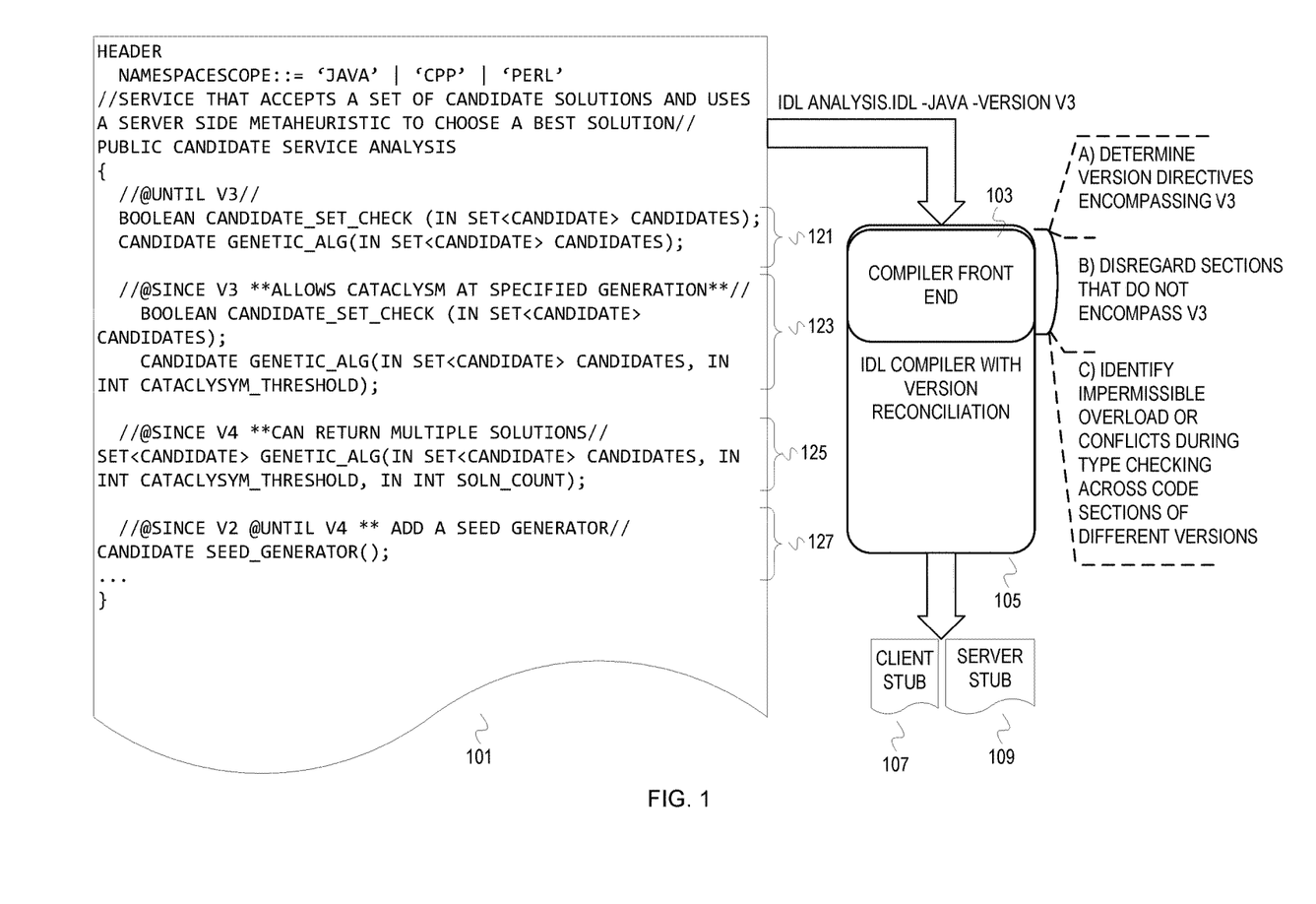
FIG. 1 is a conceptual diagram of an example IDL compiler reconciling code sections for different version ranges.

FIG. 1 is a conceptual diagram of an example IDL compiler reconciling code sections for different version ranges. An IDL compiler 105 includes version reconciliation during an analysis phase by a compiler front end 103, which includes preprocessing of compiler directives. The IDL compiler 105 will compile a file that includes IDL program code 101 and generate a client stub 107 and a server stub 109. The example program code 101 defines an interface for a service that performs a metaheuristic optimization on a set of candidate solutions to find a best solution from the submitted set of candidate solutions. The IDL compiler 105 accepts a command that includes identification of a target program language and a target version for the stubs 107, 109. The example command of FIG. 1 identifies the target program language as the Java® programming language and a target version as "V3." Based on this command, the IDL compiler 105 will generate the stubs 107, 109 with a compiler backend that generates an intermediate representation recognizable by a compiler backend that is specific to Java program code. The IDL compiler 105 can load a module or library to generate the intermediate representation and the stubs 107, 109. The IDL compiler 105 generates the intermediate representation after pre-processing and analysis (e.g., lexical analysis, syntactic analysis, and semantic analysis) of the IDL program code 101. The IDL program code 101 refers to a "CANDIDATE" data type, which has not been defined in this illustration to avoid overcomplicating the illustration.

FIG. 1 is annotated with a series of letters A-C. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the compiler front end 103 performs pre-processing of the IDL program code 101. During pre-processing, the compiler front end 103 determines version directives and sections of the IDL program code 101 governed by the version directives. To avoid complicating the illustration, a version directive or combination of version directives govern a section of the program code ("code section") that follows the version directive(s) until another version directive(s) is encountered or the program code ends.

The pre-processing will determine which version directives in the IDL program code encompass the version "V3" indicated in the compile command. For this example, the directives "@SINCE" and "@UNTIL" are used. The version directive @SINCE X without a corresponding @UNTIL version directive directs the compiler to analyze the governed code section if the target version is greater than or equal to X. The version directive @UNTIL X directs the compiler to analyze a governed code section if the target version is less than X. In combination, the version directives define a range of versions. A combination of @SINCE X @UNTIL Y directs the compiler to analyze a governed code section if the target version is greater than or equal to X and less than Y. A version directive @UNTIL V3 governs a code section 121. The code section 121 includes a function call that validates a set of candidate solutions ("CANDIDATE_SET_CHECK") for a metaheuristic optimization and a function call to run a genetic algorithm ("GENETIC_ALG"). A version directive @SINCE V3 governs a code section 123. The code section 123 includes another function call to CANDIDATE_SET_CHECK and to GENETIC_ALG. But the call to GENETIC_ALG in the code section 123 includes an additional input parameter to specify a generation for a cataclysm. A version directive @SINCE V4 governs a code section 125. The code section 125 includes a call to GENETIC_ALG, but this call to GENETIC_ALG defines an output for a set of candidate solutions instead of a single candidate solution as in earlier versions. A combination of version directives @SINCE V2 @UNTIL V4 governs a code section 127. The code section 127 defines a function call to a seed generator ("SEED_GENERATOR"). Based on the version directives, the compiler front end 103 determines that the code sections 121, 125 do not encompass the version V3 of the defined service.

At stage B, the compiler front end 103 disregards for compiling the code sections that do not encompass the version V3. Since the compiler front end 103 has determined that the code sections 121, 125 do not encompass the target version V3, the compiler front end 103 will disregard the code section 121 and the code section 125. The compiler front end 103 will disregard the code section 121 because the code section 121 has been written for versions of the metaheuristic optimization service prior to V3. The compiler front end 103 will disregard the code section 125 because the code section 125 was written for versions V4 and later for the metaheuristic optimization service. Assuming V3 and V4 are major releases, the version V4 of the service may include changes that are not compatible with earlier versions of the service.

At stage C, the compiler front end 103 analyzes the remaining code sections, including reconciling the code sections governed by different version directives. The compiler front end 103 performs semantic analysis, including type checking. The results will vary depending upon the target program language since different languages have different type systems. In addition to any semantic analysis issues typically identified, the compiler front end 103 will determine semantic analysis issues that arise from the different code sections governed by different version directives. The compiler front end 103 will analyze changes between code sections to identify any impermissible overloads of service elements (e.g., functions or parameters) or conflicts in expressions. Whether an overload or conflict is permissible can depend upon the target program language. One program language may be able to resolve or accept a semantic issue in the IDL program code, while another program language will not. In FIG. 1, the compiler front end compiler analyzes the changes across remaining code sections 123, 127. The change from the code section 121 to the code section 127 is an additive change. An additive change adds an element without impacting already defined elements of the service, which does not create a semantic issue or type checking error. In this case, the code section 127 adds the function to generate a seed candidate solution. The function SEED_GENERATOR has not previously been defined, so it is additive.

Although FIG. 1 has been presented to aid in understanding the disclosure, the example illustration only captures a narrow view of the disclosure. The following flowcharts provide additional explanation without being bound to a particular example scenario, such as the briefly defined metaheuristic optimization service of FIG. 1.

Figure 2:
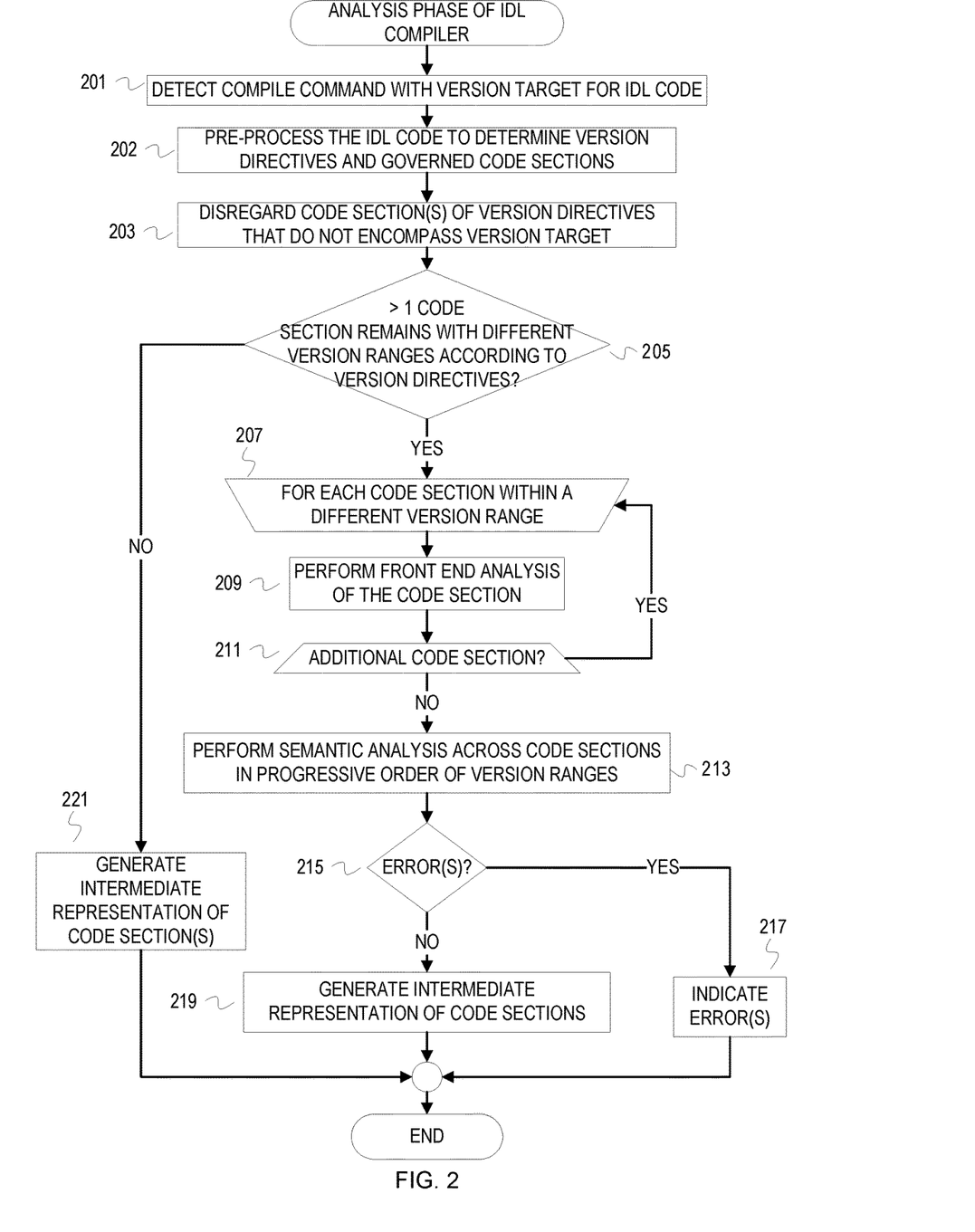
FIG. 2 depicts a flowchart of example operations for analyzing IDL program code with version directives to generate target version compliant stubs.

FIG. 2 depicts a flowchart of example operations for analyzing IDL program code with version directives to generate target version compliant stubs. FIG. 2 refers to an IDL compiler as performing the operations for naming consistency with FIG. 1.

An IDL compiler detects a compile command with a version target for a specified IDL program code (201). A user interface for the IDL compiler can accept a command with an IDL file name or a graphical indication of a particular IDL file (e.g., a graphical user interface that allows dragging and dropping of files). The compile command will also at least identify a target program language and the version target.

The IDL compiler pre-processes the directives in the IDL code and determines version directives and governed code sections (202). The IDL compiler determines each code section governed by a version directive or combination of version directives. The IDL compiler can determine which code section is governed by a version directive or combination of version directives by sequentially processing the program code. The IDL compiler can use the next version directive as a delimiter for the governed code section. To determine whether to combine version directives or treat a version directive as governing a different code section, semantics can be defined for the IDL compiler to recognize a combination of version directives. For example, the IDL compiler can recognize the @SINCE and @UNTIL version directives as a combination that governs a same code section when they occur in a same comment or when separated by blank space. As part of processing the version directives, the IDL compiler can create objects for each code section governed by a different version directive or combination of version directives. The IDL compiler could generate parse-and-syntax trees for each governed code section and associate or annotate each set of trees with the governing version directives.

After determining the version directives and governed code sections, the IDL compiler disregards those of the code sections governed by version directives that do not encompass the target version (203). As illustrated in FIG. 1, the IDL compiler determines whether a version directive or a combination of version directives encompasses a target version with comparisons against the target version. Whether a comparison is inclusive (a less than comparison for @UNTIL) or exclusive (a greater than equal to comparison for @SINCE) can vary by implementation without departing from the scope of the invention(s). After determining whether a version directive(s) encompasses the target version, the IDL compiler can disregard the governed code sections with different techniques. The IDL compiler can comment out or remove the code sections governed by version directives that do not encompass the target version, as well as commenting out or remove the governing version directives. If the IDL compiler generated trees for each governed code section, the IDL compiler can discard those objects that represent the code sections to be disregarded.

After disregarding code sections irrelevant to the target version, the IDL compiler determines whether more than one code section remains and, if so, whether the remaining code sections are governed by version directives that define different version ranges (205). If a single code section remains or all remaining code sections fall within a same version range, then the IDL compiler can proceed with generating an intermediate representation of the code section(s) (221). An IDL file may include code sections added at different times, but governed by multiple instances of a same version directive(s) that defines a same version range. For example, each of 3 different code sections may be governed by a @UNTIL 20 version directive. This can happen when multiple people are maintaining a library file, for example. In some cases, different version directives may be used and still define a same version range with respect to a target range. To illustrate, a first code section may be governed by a version directive @UNTIL 4.2.3; a second code section may be governed by a version directive @ SINCE 4; and a third code section may be governed by a version directive @ SINCE 3 @ UNTIL 4.2.3. If the target version is 4.x.y with x being less than 2 and y being less than 3, then these three different code sections can be treated by the compiler as a same code section governed by a same version directive based on the target version of 4. The IDL compiler can avoid analyzing for changes across version ranges.

If the IDL compiler determines that more than one code section remains and is governed by version directives that define different version ranges (205), then the IDL compiler processes each of the remaining code sections falling within different ranges (207). If the remaining code sections include code sections that effectively fall within a same version range as previously described, the IDL compiler can coalesce those code sections. The IDL compiler performs front-end analysis of each code section within a different version range (209), and continues through each code remaining code section (211). In this manner, the IDL compiler separately analyzes each of the code sections within a different version range. The IDL compiler can detect compile errors regardless of the version ranges.

After individually analyzing the code sections in different version ranges, the IDL compiler performs semantic analysis across the code sections in progressive order of version ranges (213). The IDL compiler analyzes the changes across code sections of different version ranges to identify semantic errors arising from the changes across version ranges as defined by version directives. If an error(s) is discovered (215), then the IDL compiler indicates the error(s) (217). For instance, the IDL compiler annotates the IDL program code or generates a notification to indicate the error. If no error(s) is discovered (215), then the IDL compiler generates an intermediate representation of the code sections.

Figure 3:
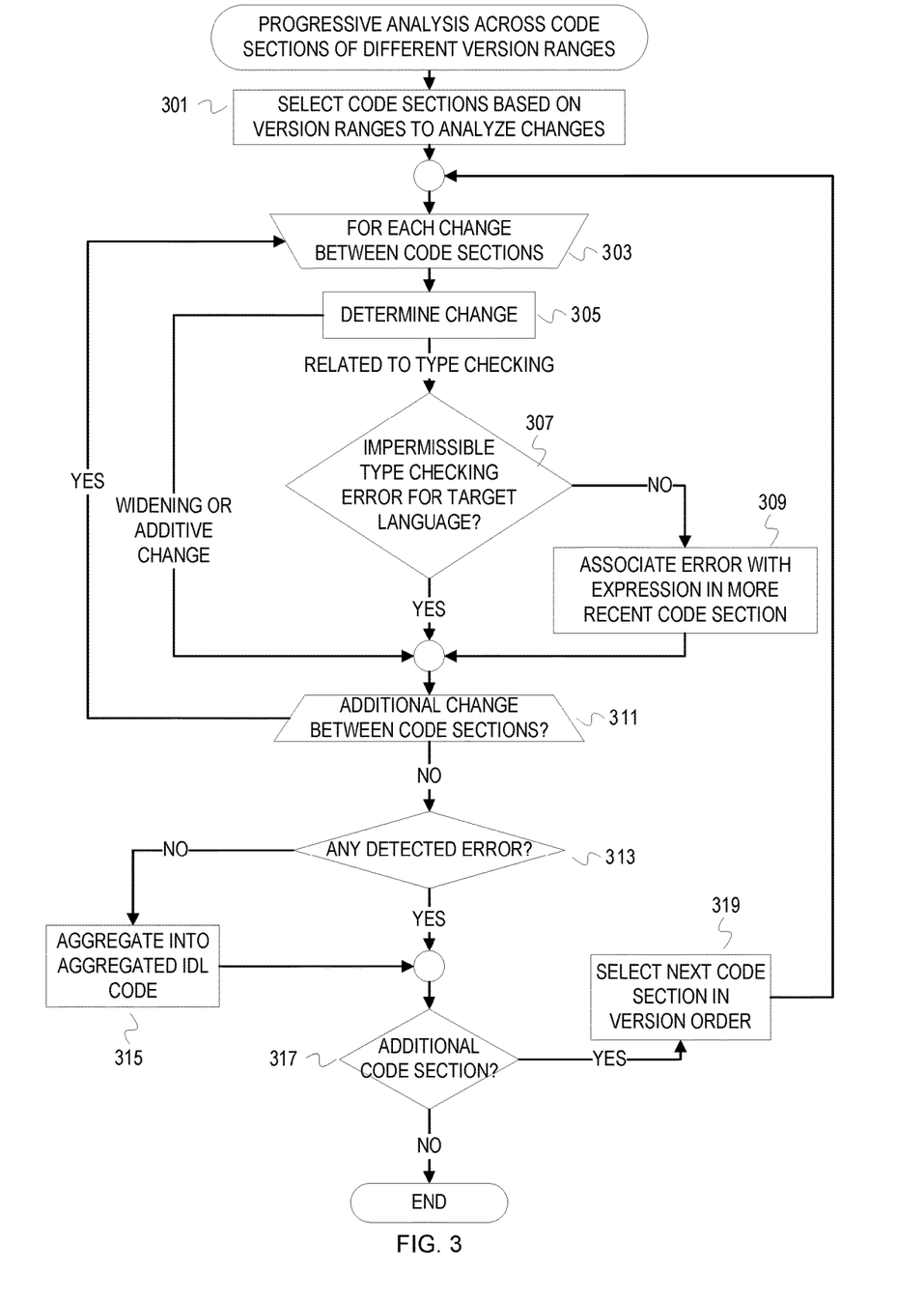
FIG. 3 depicts a flowchart of example operations for performing semantic analysis across code sections of different version ranges.

FIG. 3 depicts a flowchart of example operations for performing semantic analysis across code sections of different version ranges. As indicated in FIG. 2, allowing code sections to be added and/or changed for different versions of an interface or library can create additional semantic issues, which may or may not be errors that prevent successful compiling.

An IDL compiler selects code sections based on version ranges defined by governing version directives to analyze changes between the code sections for semantic issues (301). The IDL compiler selects the code sections from the code sections that are relevant to the target version. Since the remaining, relevant code sections fall within different version ranges, the IDL compiler selects code sections that fall within the earliest version ranges, which can overlap.

The IDL compiler analyzes each change between selected code sections to determine any semantic issues (303). This analysis includes the IDL compiler determining the type of change (305). The IDL compiler is programmed or configured to determine whether a change is a widening change, an additive change, or a type checking related change. A widening change would be a change that adds an element that is optional, for example using an optional tag or directive. An additive change is a change that adds an element and does not impact a previously defined element (e.g., a new parameter or new method/function call). Since analysis has already been performed on the individual code sections, these changes do not trigger additional analysis. For a type checking related change, the IDL compiler does not necessarily determine that a change is "type checking" related or classify the change. The IDL compiler can determine that the change is not a readily permissive change (i.e., a widening or additive change), and proceed with semantic analysis across the code sections. Although the code sections were previously analyzed individually, the IDL compiler now performs semantic analysis on the code sections together. This allows the IDL compiler to determine whether the change between code sections creates a type checking error that is impermissible for the target program language (307). Certain types of parameter or function overloading can be resolved by some program languages and some semantic issues can be handled by the compiler backend for a certain program language (e.g., downcasting in Java code). Similarly, some assignment conflicts can be resolved for certain program languages. If the IDL compiler determines that the change causes an impermissible type checking error (307), then the IDL compiler associates the error with the expression in the more recent code section (309). Since the error did not arise until the analysis across code sections, the IDL compiler indicates the change in the later version range code section as the cause of the type checking error. After evaluating a change and possibly associating a detected type checking error with the expression corresponding to the change, the IDL compiler proceeds with the next change between selected code sections (311).

After the IDL compiler completes analysis of changes across code sections of different version ranges, the IDL compiler determines whether an error was detected (313). While analyzing, the IDL compiler will have maintained a data that indicates each detected error. This data can be maintained according to various techniques. For example, the IDL compiler can maintain mappings of detected errors to expressions or code lines or annotate the syntax tree.

If the IDL compiler did not detect an error from the analysis (313), then the IDL compiler aggregates the selected code sections into an aggregated IDL code (315). When the IDL compiler completes analysis without errors, the IDL compiler modifies the program code being compiled to discard the separation of code sections by version ranges. For example, the IDL compiler can merge objects or trees if the code sections are represented by different trees and/or objects. If the IDL compiler manipulates the IDL program code, the IDL compiler can remove the version directives and arrange the code sections to be adjacent or sequential when no errors are detected. Rearranging the code may cause a change in code line number, but the IDL compiler could also add extra lines if errors are tracked by code lines to maintain validity of the code line numbers. The aggregation is not necessary, but may streamline generation of the intermediate representation and facilitate isolation of code sections with errors. For instance, the IDL compiler may provide a developer an option of proceeding with generating an intermediate representation of an aggregate of code sections without a code section with a detected semantic error arising from a cross version range change.

After aggregating code sections or detecting an error in a code section, the IDL compiler continues processing a next code section, if any (317). If there is an additional code section, the IDL compiler analyzes changes between next code section and the aggregate of code sections that have been analyzed without detected errors (319). To illustrate, assume codes sections 1-3 in different increasing version ranges, with possible overlap between version ranges. If code section 2 has a change from code section 1 with a detected semantic error, then the IDL compiler will analyze changes between code section 1 and code section 3. The IDL compiler does not analyze changes between code section 2 and code section 3 because code section 2 has detected errors and will not be compiled absent an exception or forced compile by a user. This allows for the possibility of compiling the aggregate of code sections 1 and 3 to produce stubs. After analyzing the changes between code sections of different version ranges, the aggregate of code sections can be passed along for generation of an intermediate representation. However, the IDL compiler can also be designed to pause or stop compiling upon detection of a threshold number of cross code section semantic errors and/or upon detection of a particular type of semantic error.

Variations

An IDL compiler can be designed that implements version directives differently without departing from the scope of the invention(s). The directives can be expressed differently and have different implementations. For instance, the directives could be expressed #START VERSION and #ENDVERSION and in combination define an inclusive version range. A version directive could be implemented that establishes a range of versions for a code section, such as "@VERSIONRANGE 3-5." Embodiments can also define other version directives for reconciling versions. For instance, an embodiment can define a version directive @ONLY X to indicate that the governed code section should only be compiled for version X.

The above examples refer to single level of versioning. But an IDL compiler can reconcile code sections of different version ranges that conform to multiple level semantic versioning. The IDL compiler can constrain compiling to defined minor release ranges. The IDL compiler can disregard all pervious major release versions. The IDL compiler can also be designed to aggregate code sections within a same major release version range but different minor release and patch versions as part of pre-processing.

Additional directives and/or tags can be defined for an IDL compiler to influence processing of IDL program code with version directives. An earlier example referred to an OPTIONAL directive that would allow a change between code sections to be treated as an additive change. Thus, the compiler backend could disregard the corresponding expression if the expression could not be compiled properly. In contrast, a REQUIRED directive can be defined to require inclusion of the corresponding expression. If the IDL compiler is analyzing a code section with a REQUIRED directive, then the IDL compiler will not be permitted to compile the IDL program code without the code section. Or the IDL compiler may move the REQUIRED expression into another code section with a compatible version range if the encompassing code section has a semantic error.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 207, 209, 211 can be performed for difference code sections in parallel or concurrently. With respect to FIG. 3, the flowchart presents example operations that analyze each change, which is not necessary. An IDL compiler can analyze the code sections in aggregate and determine semantic issues. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
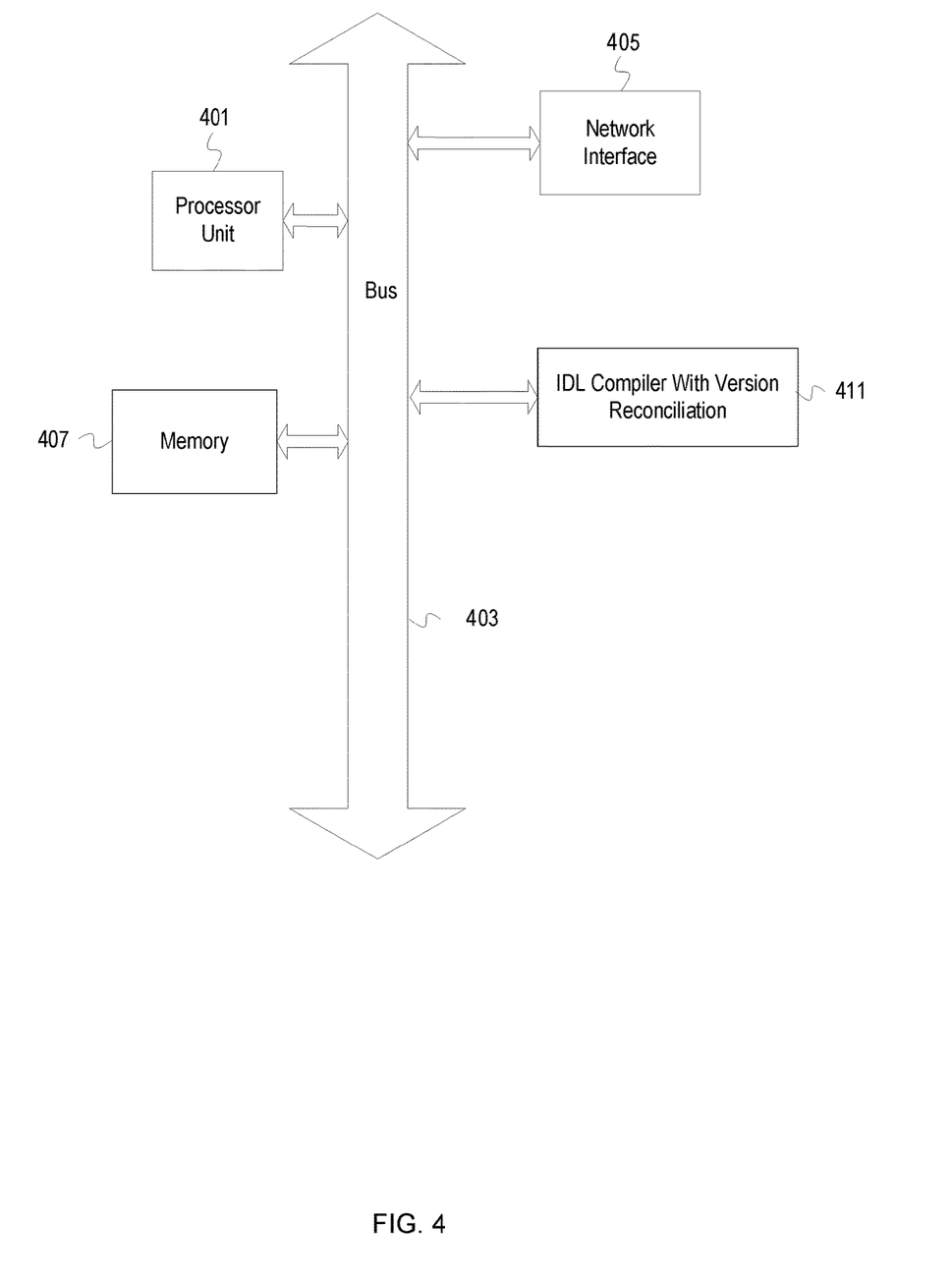
FIG. 4 depicts an example computer system with an IDL compiler with version reconciliation.

FIG. 4 depicts an example computer system with an IDL compiler with version reconciliation. The computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine readable media. The computer system also includes a bus 403 (e.g., PCI, ISA, PCI-Express, HyperTransport® bus, InfiniBand® bus, NuBus, etc.) and a network interface 405 (e.g., a Fiber Channel interface, an Ethernet interface, an internet small computer system interface, SONET interface, wireless interface, etc.). The system also includes an IDL compiler 411. The IDL compiler 411 can compile IDL program code that includes code sections governed by version directives that define different version ranges. The IDL compiler 411 determines whether changes between code sections in different version ranges lead to semantic errors (e.g., impermissible overloading). Any one of the previously described functionalities may be partially (or entirely) implemented in hardware and/or on the processor unit 401. For example, the functionality may be implemented with an application specific integrated circuit, in logic implemented in the processor unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401 and the network interface 405 are coupled to the bus 403. Although illustrated as being coupled to the bus 403, the memory 407 may be coupled to the processor unit 401.

While the aspects of the disclosure are described with reference to various implementations and exploitations, it will be understood that these aspects are illustrative and that the scope of the claims is not limited to them. In general, techniques for compiling IDL program code with code sections for different version ranges as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method performed by an interface definition language compiler, the method comprising:
based on receipt of a compile command that indicates a target version and a target program language for an interface definition language program code that includes a plurality of code sections and a plurality of compile directives that indicate versions, selecting from the plurality of code sections a set of code sections to compile, wherein the selecting is based, at least in part, on the target version and on the plurality of compile directives, wherein selecting based, at least in part, on the target version and on the plurality of compile directives comprises determining a set of the plurality of compile directives that indicates the target version or a range of versions that encompass the target version;
determining whether a change between a first of the set of code sections and a second of the set of code sections causes a semantic error, wherein the first code section is associated with a first of a set of compile directives that indicates a first range of versions and the second code section is associated with a second of the set of compile directives that indicates a second range of versions; and providing the set of code sections for generation of an intermediate representation of the set of code sections in response to a determination that no semantic error is caused by a change among the set of code sections corresponding to different version ranges.

2. The method of claim 1 further comprising associating the semantic error with an expression in the second code section in response to determining that the change between the first code section and the second code section causes the semantic error and based, at least in part, on a determination that the second range is later than the first range.

3. The method of claim 1 further comprising detecting the plurality of compile directives and determining that the set of the plurality of compile directives indicates versions that correspond to the target version.

4. The method of claim 3, wherein determining that the set of compile directives indicates the target version or a range of versions that encompasses the target version comprises determining that each of the set of compile directives either indicates the target version or indicates a range of versions that encompasses the target version.

5. The method of claim 1, wherein determining the set of code sections from the plurality of code sections comprises determining, for each of the set of compile directives, which of the plurality of code sections is governed by the compile directive.

6. The method of claim 1, wherein determining whether the change causes a semantic error comprises determining at least one of whether the change comprises adding an expression or parameter in the second code section that does not redefine an expression or parameter in the first code section, whether the change comprises an optional expression or optional parameter in either the first or the second code section, and whether the change relates to type checking.

7. The method of claim 6, further comprising generating an indication of a semantic error if the change comprises adding an expression or parameter in the second code section that redefines an expression or parameter in the first code section, or if the change comprises a type checking error that cannot be resolved with the target program language indicated in the compile command.

8. The method of claim 6, wherein determining whether the change relates to type checking comprises determining whether the change causes overloading or a type conflict.

9. The method of claim 8, wherein determining whether the change causes a semantic error comprises determining whether the overloading or the type conflict can be resolved by a compiler backend for the target program language indicated in the compile command.

10. The method of claim 1, wherein the selecting comprises disregarding those of the plurality of code sections associated with those of the plurality of compile directives that indicate a version other than the target version or that indicate a range of versions that do not encompass the target version.

11. One or more non-transitory machine readable media comprising program code for compiling an interface definition language program code, the program code to:

in response to receipt of a compile command that indicates a target version and a target program language, determine which of a plurality of code sections in the interface definition language program code is governed by a compile directive that indicates a range of versions that encompasses the target version;

disregard those of the plurality of code sections governed by a compile directive that indicates a range of versions that does not encompass the target version;

determine whether changes between code sections that have not been disregarded and are governed by compile directives that indicate different ranges of versions cause a semantic error;

provide the code sections that have not been disregarded for generation of an intermediate representation in response to a determination that the changes do not cause semantic errors; and associate a semantic error caused by a change between code sections with a corresponding expression or parameter in the code section of a later range of versions.

12. The one or more non-transitory machine readable media of claim 11, wherein the semantic error comprises a type check error that is impermissible for a target program language indicated in the compile command.

13. An apparatus comprising:

a processor; and a machine readable medium comprising program code executable by the processor to cause the apparatus to, based on receipt of a compile command that indicates a target version and a target program language for an interface definition language program code that includes a plurality of code sections and a plurality of compile directives that indicate versions, select from a plurality of code sections a set of code section to compile, wherein selection is based, at least in part, on the target version and on the plurality of compile directives, wherein the program code to select comprises the program code executable by the processor to cause the apparatus to determine which of the plurality of compile directives indicates the target version or a range of versions that encompasses the target version;

determine whether a change between a first of the set of code sections and a second of the set of code sections causes a semantic error, wherein the first code section is associated with a first of the plurality of compile directives that indicates a first range of versions and the second code section is associated with a second of the plurality of compile directives that indicates a second range of interface versions, wherein each of the first and second ranges of versions encompasses the target version; and provide the set of code sections for generation of an intermediate representation of the set of code sections in response to a determination that no semantic error is caused by a change among the set of code sections corresponding to different version ranges.

14. The apparatus of claim 13, wherein the machine readable medium further comprises program code executable by the processor to cause the apparatus to associate the semantic error with an expression in the second code section in response to a determination that the change causes the semantic error and based, at least in part, on a determination that the second range is later than the first range.

15. The apparatus of claim 13, wherein the program code to determine the set of code sections from the plurality of code sections comprises program code executable by the processor to cause the apparatus to determine, for each of the plurality of compile directives determined to indicate the target range or a range that encompasses the target range, which of the plurality of code sections is governed by the compile directive.

16. The apparatus of claim 13, wherein the program code to determine whether the change causes a semantic error comprises program code executable by the processor to cause the apparatus to determine at least one of whether the change comprises adding an expression or parameter in the second code section that does not redefine an expression or parameter in the first code section, whether the change comprises an optional expression or optional parameter in either the first or the second code section, and whether the change relates to type checking.

17. The apparatus of claim 16, wherein the machine readable medium further comprises program code executable by the processor to cause the apparatus to generate an indication of a semantic error if the change comprises adding an expression or parameter in the second code section that redefines an expression or parameter in the first code section, or if the change comprises a type checking error that cannot be resolved with a target language indicated in the compile command.

18. The apparatus of claim 16, wherein the program code to determine whether the change relates to type checking comprises program code executable by the processor to cause the apparatus to determine whether the change causes overloading or a type conflict.

19. The apparatus of claim 18, wherein the program code to determine whether the change causes a semantic error comprises program code executable by the processor to cause the apparatus to determine whether the overloading or the type conflict can be resolved by a compiler backend for the target program language indicated in the compile command.

20. The apparatus of claim 13, wherein the program code to select comprises program code executable by the processor to cause the apparatus to disregard those of the plurality of code sections associated with those of the plurality of compile directives that indicate a version other than the target version or indicate a range of versions that do not encompass the target version.

* * * * *